United States Patent
Islam

(10) Patent No.: US 9,645,341 B2
(45) Date of Patent: May 9, 2017

(54) CABLE ASSEMBLY WITH CONNECTOR HAVING TWIST ABILITY FOR ALIGNING MATING FEATURES

(71) Applicant: CommScope Technologies LLC, Hickory, NC (US)

(72) Inventor: Nahid Islam, Westmont, IL (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 14/619,289

(22) Filed: Feb. 11, 2015

(65) Prior Publication Data

US 2015/0226927 A1    Aug. 13, 2015

Related U.S. Application Data

(60) Provisional application No. 61/938,650, filed on Feb. 11, 2014.

(51) Int. Cl.
*G02B 6/44*      (2006.01)

(52) U.S. Cl.
CPC .......... *G02B 6/4416* (2013.01); *G02B 6/4473* (2013.01); *G02B 6/4477* (2013.01)

(58) Field of Classification Search
CPC ...... G02B 6/443; G02B 6/4416; G02B 6/441; G02B 6/4486; G02B 6/4477; H01B 11/22; H01B 13/02; H01B 13/00; H01B 7/1855; H01B 7/1875
USPC .......................... 385/100, 101, 106, 109, 112
See application file for complete search history.

(56) References Cited

U.S. PATENT DOCUMENTS

| | | | |
|---|---|---|---|
| 5,125,060 A | 6/1992 | Edmundson | |
| 5,210,812 A | 5/1993 | Nilsson et al. | |
| RE36,592 E * | 2/2000 | Giebel | G02B 6/3897 174/23 R |
| 7,251,411 B1 | 7/2007 | Lu et al. | |
| 7,346,243 B2 | 3/2008 | Cody et al. | |
| 7,409,127 B1 * | 8/2008 | Hurley | G02B 6/3817 385/101 |
| 7,418,177 B2 | 8/2008 | Lu et al. | |
| 7,596,291 B2 | 9/2009 | Cody et al. | |
| 2006/0120672 A1 * | 6/2006 | Cody | G02B 6/3807 385/86 |
| 2010/0316340 A1 | 12/2010 | Sales Casals et al. | |

(Continued)

*Primary Examiner* — Kaveh C Kianni
*Assistant Examiner* — Hung Lam
(74) *Attorney, Agent, or Firm* — Myers Bigel, P.A.

(57) ABSTRACT

A hybrid cable includes a sleeve surrounding conductors and optical fibers. The sleeve is attached to a transition element. In one embodiment, the optical fibers exiting the transition element are surrounded by a first jacket, and the conductors exiting the transition element are surrounded by a second jacket. The sleeve may be attached to a second transition element, such that the conductors and optical fibers pass through the second transition element, and at least the conductors enter a flexible tube and pass to a connector. If the conductors and optical fibers pass through the flexible tube, the connector may be a hybrid connector terminating both the conductors and optical fibers. The flexible tube can twist about its axis of extension per linear foot without incurring a kink to a greater degree than the sleeve can twist about its axis of extension per linear foot without incurring a kink.

20 Claims, 5 Drawing Sheets

(56) References Cited

U.S. PATENT DOCUMENTS

| | | | |
|---|---|---|---|
| 2011/0243514 A1* | 10/2011 | Nave | G02B 6/4459 385/110 |
| 2012/0213483 A1 | 8/2012 | Risch et al. | |
| 2012/0308184 A1* | 12/2012 | Pina | G02B 6/4465 385/102 |
| 2013/0287348 A1 | 10/2013 | Register, Iii et al. | |
| 2013/0294735 A1* | 11/2013 | Burris | G02B 6/4415 385/101 |
| 2013/0336622 A1 | 12/2013 | Islam | |

* cited by examiner

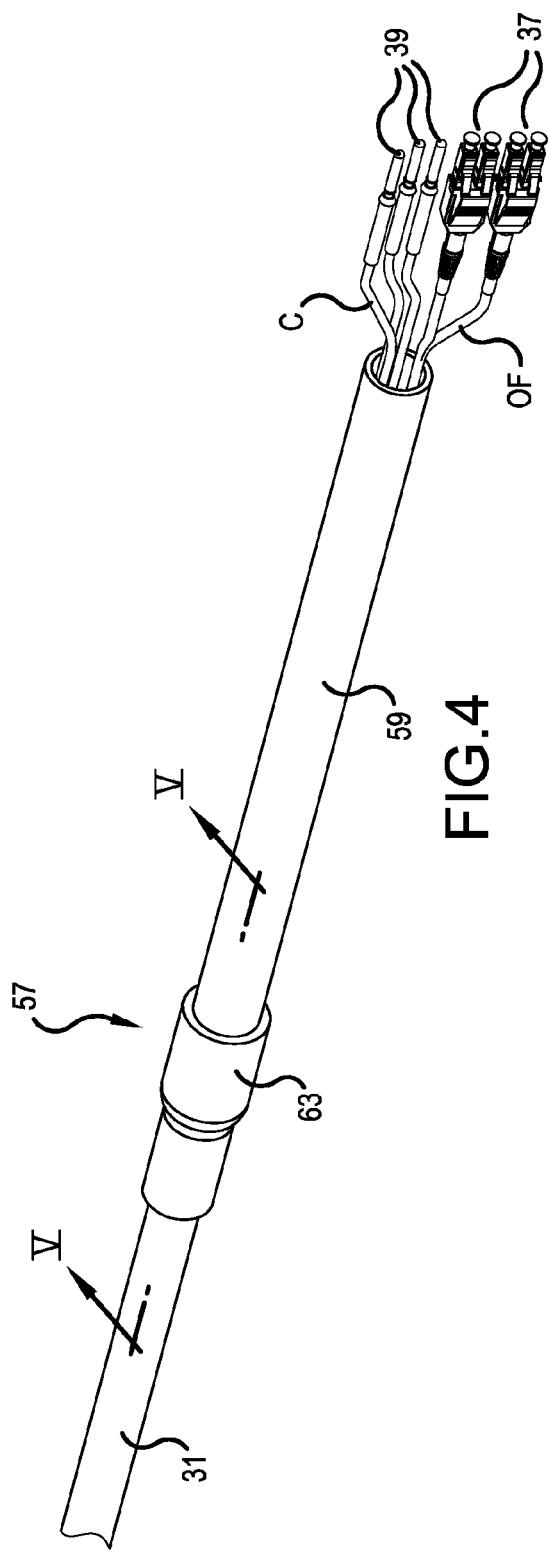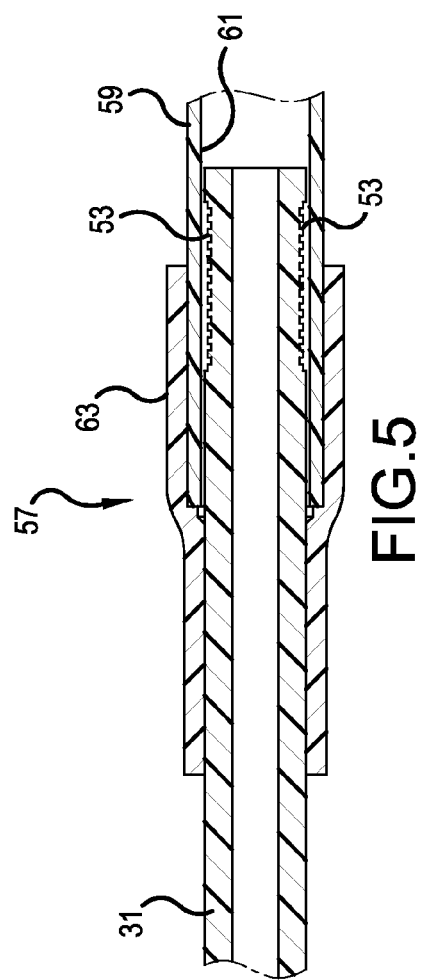

CABLE ASSEMBLY WITH CONNECTOR HAVING TWIST ABILITY FOR ALIGNING MATING FEATURES

This application claims the benefit of U.S. Provisional Application No. 61/938,650, filed Feb. 11, 2014, which is herein incorporated by reference.

BACKGROUND OF THE INVENTION

1. Field of the Invention

The present invention relates to a cable assembly for optical fibers and/or conductors, such as found in a hybrid cable. The present invention relates to a cable, which may break out one or more power cables, e.g., copper cables for power transmission to baseband units, and break out one or more optical fibers to a termination, e.g., duplex LC and/or MPO connectors for data transmissions with baseband units. More particularly, the present invention relates to a cable section having an improved twist ability to assist in mating a connector attached to an end of the cable and/or to a breakout section having improved functionality.

2. Description of the Related Art

Hybrid cables are known in the prior art. However, the Applicant has appreciated a need for improved transitions to process the breakout of the hybrid cable to fiber and conductor portions. Further, the Applicant has appreciated a need for a cable jacket section having a relatively better twist ability, as compared to other sections of the cable or prior cable designs, so that a connector plug termination of the cable may having its mating features more readily aligned, or clocked, to complimentary mating features of a port.

SUMMARY OF THE INVENTION

In one embodiment of the present invention, a hybrid cable assembly includes at least one power conductor and at least one optical fiber. The cable is connectorized with a first, outdoor ruggedized fiber/copper hybrid connector. In order to allow the first connector to mate with a second hybrid connector mounted to an enclosure, the first connector must be aligned and keyed to features of the second connector.

The Applicant has appreciated that the prior art hybrid cables, having both power conductors and optical fibers, are often rigid and difficult to twist and flex. Therefore, aligning the keying features of the first connector to the corresponding keying features of the second connector can be difficult and/or can lead to a kink in the cable.

In order to address this problem, a flexible junction area is introduced between the first connector's termination face and the mid-span of the hybrid cable, so that the first connector can be easily moved, twisted and/or aligned relative to the second connector.

These and other objectives are accomplish by a hybrid cable assembly including a common sleeve surrounding a plurality of conductors and a plurality of optical fibers, said common sleeve being attached to a transition element, such that said plurality of conductors and said plurality of optical fibers enter said transition element; said plurality of optical fibers exiting said transition element and being surrounded by a first jacket; and said plurality of conductors exiting said transition element and being surrounded by a second jacket.

Further, these and other objectives are accomplish by a hybrid cable assembly including a common sleeve surrounding at least one conductor and at least one optical fiber, said common sleeve being attached to a transition element, such that said plurality of conductors and said plurality of optical fibers enter said transition element; said at least one conductor exiting said transition element and being surrounded by a flexible tube; said at least one optical fiber exiting said transition element and being surrounded by said flexible tube; said at least one conductor exiting said flexible tube and being terminated within a hybrid connector; and said at least one optical fiber exiting said flexible tube and being terminated within said hybrid connector, wherein said flexible tube can twist about its axis of extension per linear foot without incurring a kink to a greater degree than said common sleeve can twist about its axis of extension per linear foot without incurring a kink.

Moreover, these and other objectives are accomplish by a hybrid cable assembly including a common sleeve surrounding a plurality of conductors and a plurality of optical fibers, said common sleeve being attached to a transition element, such that said plurality of conductors and said plurality of optical fibers enter said transition element; said plurality of conductors exiting said transition element and being surrounded by a jacket, wherein said jacket is formed as a flexible tube; said plural conductors exiting said flexible tube and being terminated within a first connector, wherein said flexible tube can twist about its axis of extension per linear foot without incurring a kink to a greater degree than said common sleeve can twist about its axis of extension per linear foot without incurring a kink.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein:

FIG. 4 is a perspective view of a portion of the hybrid cable assembly of FIG. 2 with the flexible tube installed, but with the hybrid connector removed;

FIG. 5 is a cross sectional view taken along line V-V in FIG. 4, but with conductors and optical fibers removed to enhance clarity;

DETAILED DESCRIPTION OF EMBODIMENTS OF THE INVENTION

Figure 1:
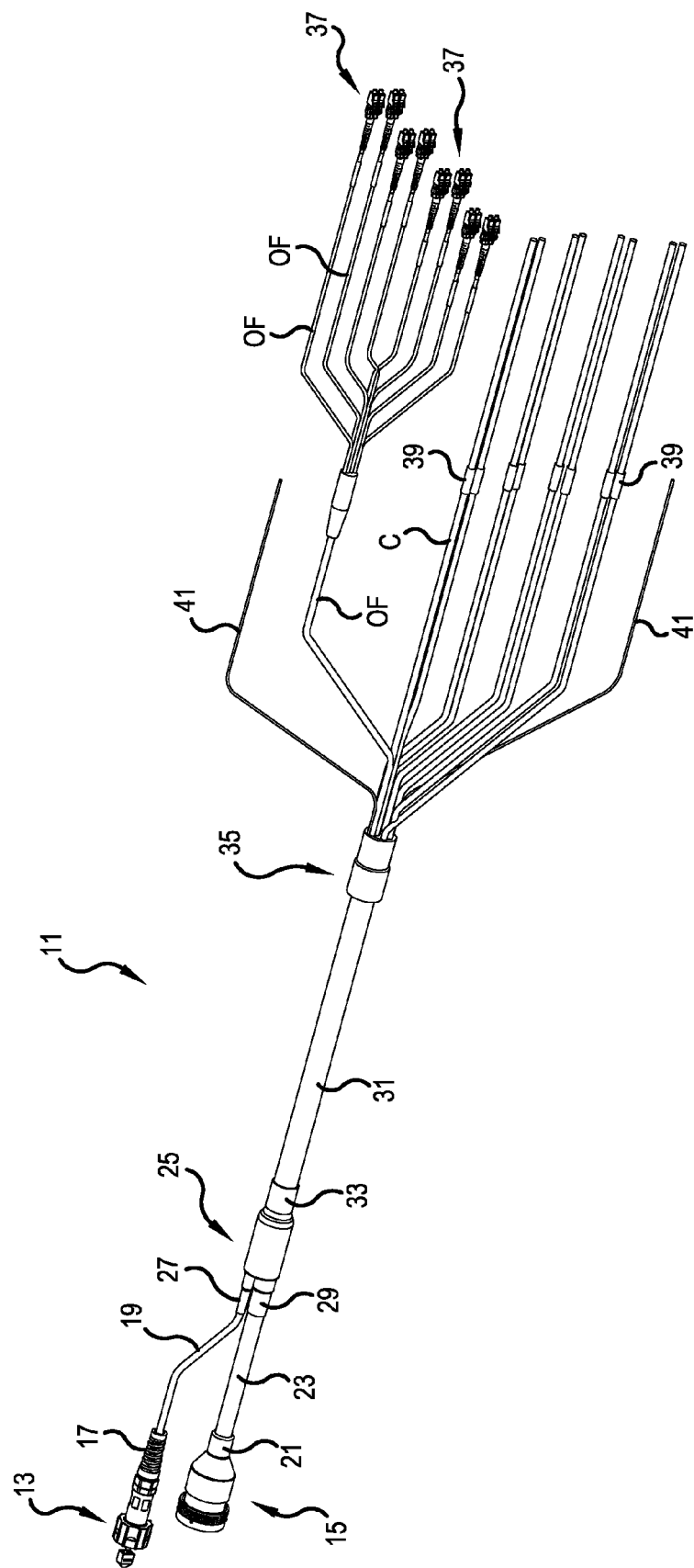
FIG. 1 is a perspective view of a hybrid cable assembly, in accordance with a first embodiment of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

FIG. 1 shows a hybrid cable assembly 11. A first end, left side of FIG. 1, shows first and second connectors 13 and 15. The first connector 13 may be dedicated to optical terminations, such as an MPO termination, several LC terminations, or any other known type of optical terminations, such as SC or ST. The second connector 15 may be dedicated to conductor terminations, such as electrically conductive pins, or sockets to accept pins, for the transmission of power and/or signaling. The second connector 15 may also be a hybrid connector having both optical terminations and conductive terminations.

The first connector 13 includes a first strain relief 17 attached to a first jacket 19 surrounding the optical fibers, which terminate in the first connector 13. The second connector 15 includes a second strain relief 21 attached to a second jacket 23 surrounding the conductors, which terminate in the second connector 15.

The first and second jackets 19 and 23 are attached to a first transition element 25. As shown on the left side of the first transition element 25 in FIG. 1, the first jacket 19 may be attached to the first transition element by a third strain relief 27 and the second jacket 23 may be attached to the first transition element 25 by a fourth strain relief 29.

In a preferred embodiment, the first jacket 19 may obtain some additional strain relief by a connection to the second jacket 23, as the second jacket 23 is more rigid, e.g., less flexible, than the first jacket 19. The connection between the first and second jackets 19 and 23 may be accomplished by connecting the third and fourth strain reliefs 27 and 29 by a web of material, such as by an over molding operation, by a heat shrink material, by an adhesive, or by initially forming the third and fourth strain reliefs 27 and 29 with a connection there between as a single, unitary piece for attachment to the first transition element 25.

On the right side of the first transition 25 in FIG. 1, a first end of a common sleeve 31 is attached to the first transition 25 by a fifth strain relief 33. The common sleeve 31 surrounds the conductors and optical fibers, which terminate in the first and second connectors 13 and 15 and pass through the first transition element 25.

A second side of the common sleeve 31 is attached to a left side of a second transition element 35 in FIG. 1. The optical fibers OF and conductors C exit the right side of the second transition 35 in FIG. 1, and fan out into several optical terminations, e.g., LC duplex connectors 37, and several conductive terminations, e.g., pin/socket terminals 39. One or more optional conductors 41, such as drain lines, bare ground wires, etc. may also be included within the common sleeve 31 and exit the right side of the second transition 35 in the fan out. The optical fibers OF may be of any known type, such as single mode or multimode optical fibers, and such as single core or multi-core optical fibers. The conductors C may of formed of any known type of conductors, such as copper or aluminum, and may have cross sectional shapes of any know type such as circular or rectangular.

Figure 2:
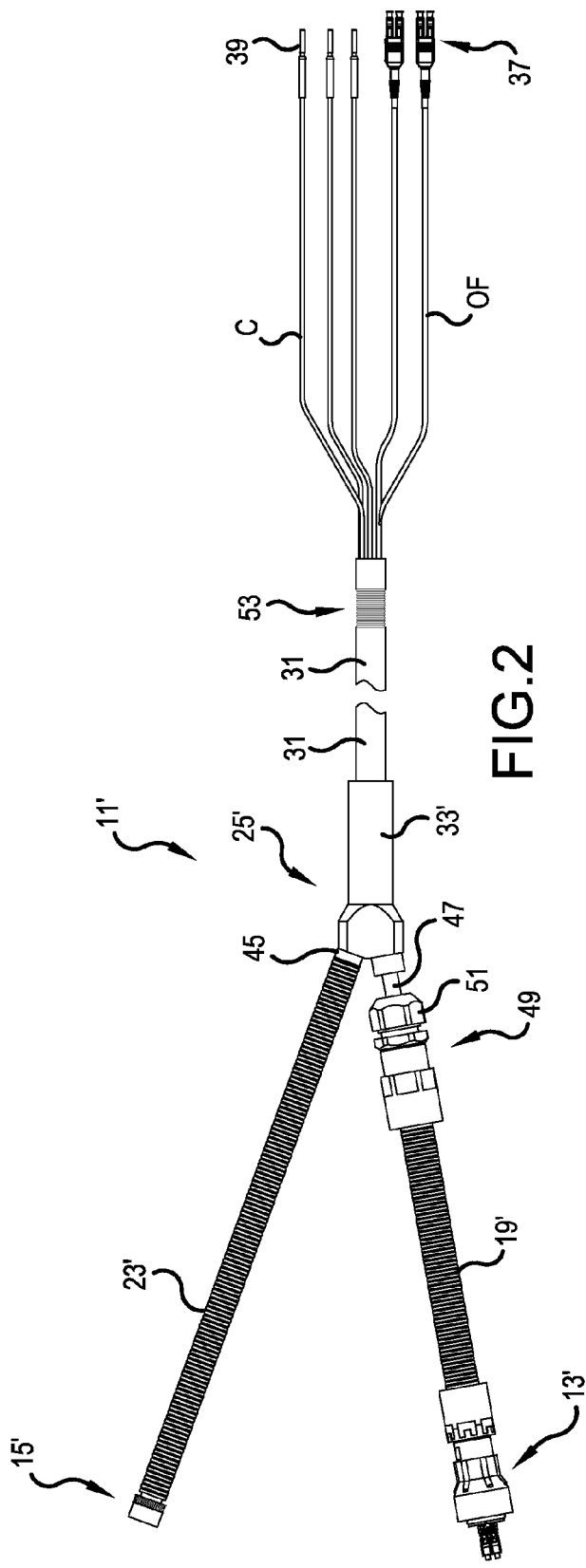
FIG. 2 is a side view of a hybrid cable assembly with a flexible tube and hybrid connector removed, in accordance with a second embodiment of the present invention.

FIG. 2 is a view similar to FIG. 1, but illustrating a different embodiment of the hybrid cable 11'. The optical fibers OF pass through the first jacket 19' to the first connector 13'. The first connector 13' may present a pair of duplex LC connectors within a weather resistant housing, having a twist on bayonet coupling system. Such connector housings are known in the art. The first jacket 19' may be formed of a corrugated flexible material, such as a ribbed polymer tube, which completely protects the optical fibers OF from the environment, which is highly flexible due to the ribs, and which can twist about its axis of extension.

The conductors C pass through the second jacket 23' to the second connector 15'. The second connector 15' may present conductive pins, or sockets to accept pins, or any other known conductor mating system. The second jacket 23' may also be formed of a corrugated flexible material, such as a ribbed polymer tube, which completely protects the conductors C from the environment, which is highly flexible due to the ribs, and which can twist about its axis of extension.

Figure 8:
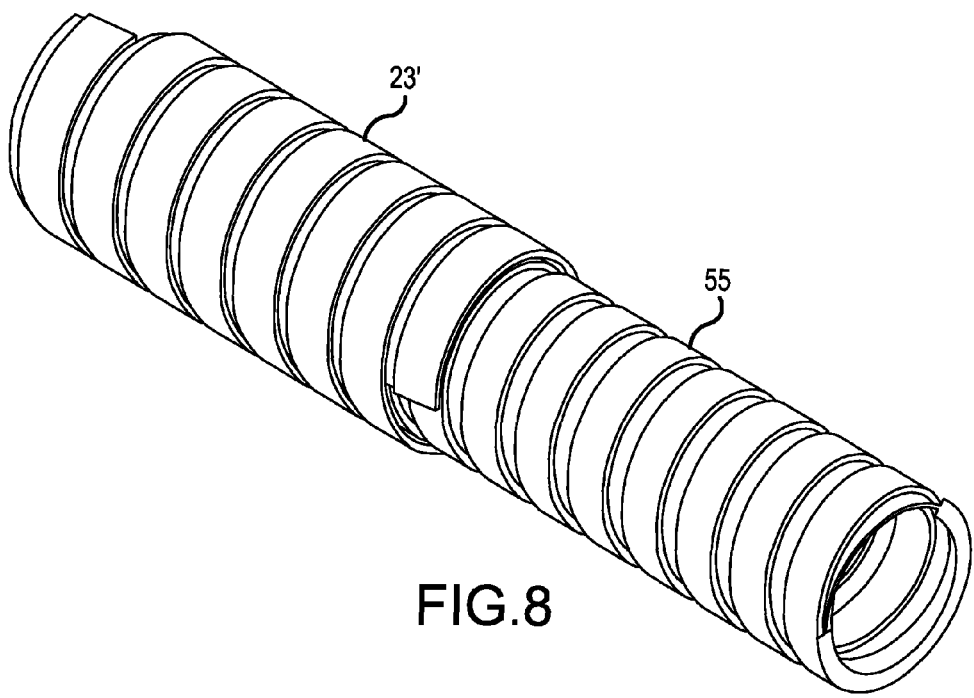
FIG. 8 is a perspective view of a corrugated flexible tube installed over an armor layer, but with conductors and optical fibers removed to enhance clarity.

As illustrated in FIG. 8, the second jacket 23' may optionally surround an armor layer 55. The armor layer 55 surrounds the conductors C. The armor layer 55 can provide electromagnetic interference (EMI) shielding to the conductors C within. One or more of the conductors C within the armor layer 55, such as the optional conductors 41, may be electrically connected to the armor layer 55 to provide grounding and/or lightening protection. The armor layer 55 may also provide bird and rodent protection, so that an animal may not easily damage the conductors C within the armor 55. To this end, it may be beneficial to include an armor layer 55 surrounding the optical fibers OF to protect the optical fibers OF against damage from birds and other rodents.

Figure 3:
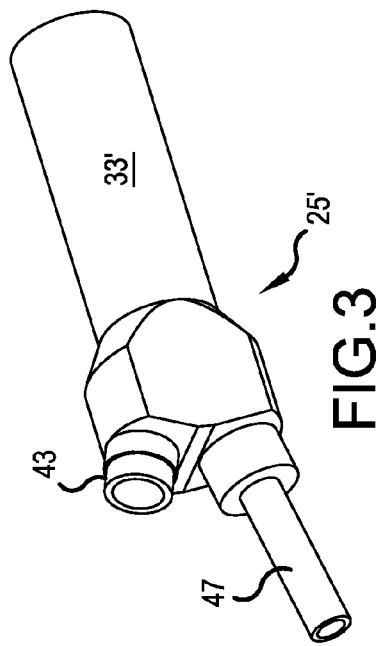
FIG. 3 is a perspective view of a first transition element of the hybrid cable assembly of FIG. 2.

The first and second jackets 19' and 23' are attached to the first transition element 25'. As best seen in FIG. 3, the first transition element 25' includes an outer circumferential portion 43, over which a collar 45 of the second jacket 23' resides. An adhesive resides between the outer circumferential portion 43 and an inner surface of the collar 45 of the second jacket 23' to create a weather tight fitting. The connection may optionally be further enhanced by over molding or heat shrinking additional material over the connection area.

As best seen in FIG. 3, the first transition element 25' also includes a nipple 47. An environmental sealing nut 49 is mated onto the nipple 47. The first jacket 19' is attached to the environmental sealing nut 49, e.g., by an adhesive, over molded material and/or heat shrink material. The environmental sealing nut 49 is removably secured to, and released from, the nipple 47 by tightening or loosening a nut portion 51 of the environment sealing nut 49. respectively. Internally, the environmental sealing nut 49 includes a sealing gland, which is compressed in a radial direction and seals onto the nipple 47, when the nut portion 51 is tightened, to provide a weather resistant seal.

The common sleeve 31 is attached to and exits the first transition element 25' from a side of the first transition element 25' opposite the side having the outer circumferential portion 43 and the nipple 47, e.g., the right side in FIGS. 2 and 3. The attachment between the common sleeve 31 and the first transition element 25' may be made by an adhesive, and may additionally be sealed by an over molded material or heat shrink material. A distal end of the common sleeve 31 includes a ridged portion 53.

The perspective view of FIG. 4 and the cross sectional view of FIG. 5 show that the ridged portion 53 resides within a modified second transition element 57. A flexible tube 59 passes over the common sleeve 31, such that an inner surface 61 of the flexible tube 59 surrounds the ridged portion 53 formed on the outer surface of the common sleeve 31. If an armor layer 55 is used within the common sleeve 31, an annular portion of the common sleeve 31 may be removed to expose the ribs on the outside of the armor layer 55 in order to form the ridged portion 53 of FIGS. 2 and 5, instead of forming the ridged portion 53 on the outer surround of the common sleeve 31.

An adhesive may be used to attach the ridged portion 53 to the inner surface 61 of the flexible tube 59. To further enhance the weather resistance of the modified second transition element 57, a first over molded portion 63 may be applied over the overlap of the flexible tube 59 and the common sleeve 31. Alternatively, the first portion 63 may represent a heat shrink material.

The conductors C and optical fibers OF exit the second transition element 57 and pass through the flexible tube 59. The distal end of the flexible tube 59 has the optical fibers OF and the conductors C extending outwardly therefrom. The optical fibers OF are terminated to optical connectors, and the conductors C are terminated to conductive connectors. For example, the optical fibers OF may be terminated to a first and second pair of LC duplex connectors 37 and the conductors C may be terminated to three conductive pins 39.

Figure 6:
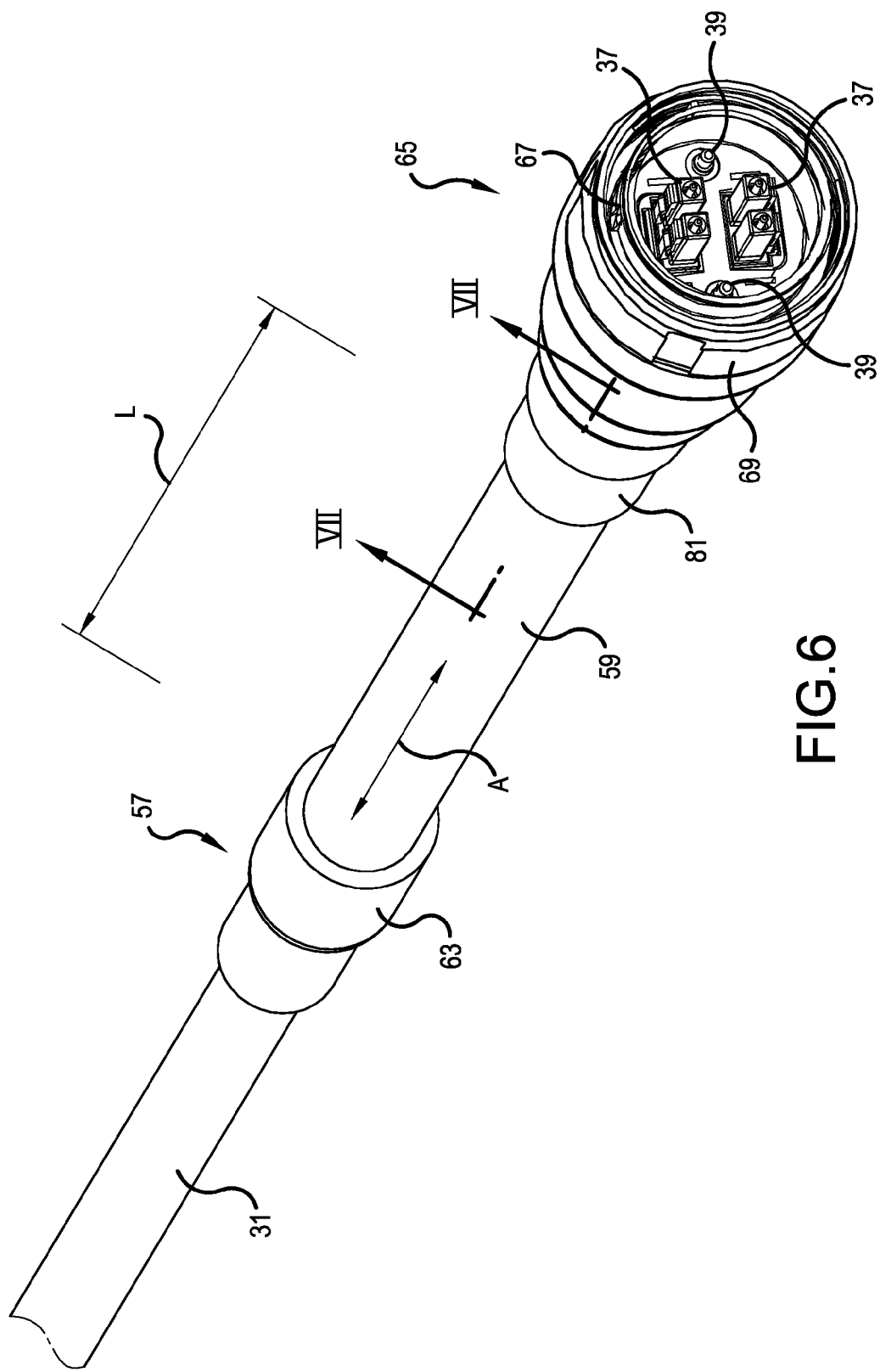
FIG. 6 is a perspective view of the same portion of the hybrid cable assembly depicted in FIG. 4, but with the hybrid connector installed.
Figure 7:
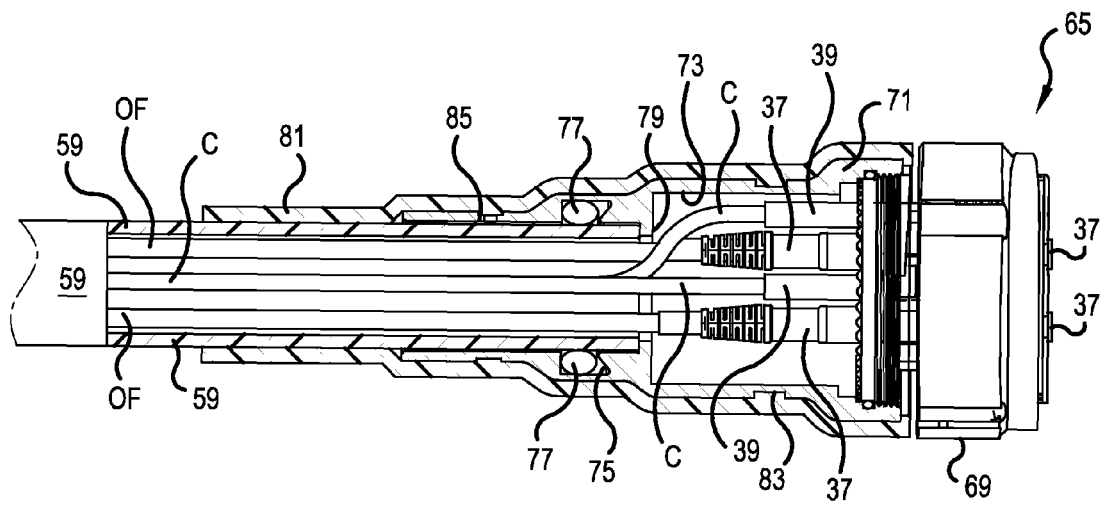
FIG. 7 is a cross sectional view taken along line VII-VII in FIG. 6.

As best seen in a preferred embodiment of FIGS. 6 and 7, the LC duplex terminations 37 and conductive pins 39 are mounted into a single hybrid connector 65. As best seen in the cross sectional view of FIG. 7, the hybrid connector 65 has a shell 71, such as an Amphenol military specification, weather resistant shell. The shell 71 may be formed of metal, and is preferably electrically conductive. The shell 71 includes at least one keying feature, such as a receiving slot 67 for accepting a first lug of a housing surrounding a mating port. An outer ring 69 of the shell 71 is rotated several degrees, e.g., twenty degrees to capture a second lug of the housing surrounding the mating port in a bayonet coupling arrangement.

To attach the hybrid connector 65 to the housing and to mate the LC duplex connectors 37 and conductive pins 39 to the complimentary features of the mating port, the hybrid connector 65 requires a clocked alignment of the receiving slot 67 to the first lug of the housing surrounding the mating port prior to connection, so that the LC duplex connectors 37 and conductive pins 39 will align to the complimenting features of the mating port. The outer ring 69 of the shell 71 of the hybrid connector 65 also requires a bayonet twist, e.g., twenty degrees, to lock the hybrid connector 65 to the second lug of the housing surrounding the mating port.

To achieve the twisting of the hybrid connector 65 necessary for mating of the hybrid connector 65, the flexible tube 59 has flexibility and an ability to twist about its axis of extension A. The flexible tube 59 can twist about its axis of extension A, per linear foot, without incurring a kink, to a greater degree than the common sleeve 31 can twist about its axis of extension, per linear foot, without incurring a kink.

In one embodiment, a length L of the flexible tube 59 from the second transition element 57 to the hybrid connector 65 is between about 10 inches and 48 inches, such as about 12 to 40 inches, or more particularly about 24 to 36 inches. In a preferred embodiment, the length L of the flexible tube 59 is in the range of about 10 to 30 times a diameter of the flexible tube 59, such as about 15 to 25 times the diameter of the flexible tube 59.

The flexible tube 59 may also surround an armor layer 55, as shown in FIG. 8. The armor layer 55 would in turn surround the plural of conductors C and the plural optical fibers OF. One or more of the plural conductors C, such as the optional conductors 41, may be electrically connected to the armor layer 55. As previously mentioned, the arrangement of the armor layer 55 may provide benefits for EMI shielding, lightening strike protection, and/or bird and rodent protection for the conductors C and optical fibers OF and/or conductors C within the armor layer 55.

FIG. 7 is a cross sectional view taken along line VII-VII in FIG. 6. FIG. 7 illustrates the attachment of the hybrid connector 65 to the flexible tube 59. The flexible tube 59 is inserted into the interior of the shell 71 until an end of the flexible tube 59 abuts a surface of a stop wall 79. If the armor layer 55 is used, an outer portion of the armor layer 55 may be exposed so as to may electrical contact with an inner surface 73 of the shell 71. Further, one of the optional conductors 41 may be electrically connector to the shell 71 for grounding.

The front of the hybrid connector 65 may also be rotatable to a limited degree relative to the rear of the hybrid connector 65, e.g., +/−35 to 100 degrees, allowing a total angular twist of about 70 to 200 degrees, such as about 180 degrees. The twist of the front half of the hybrid connector 65 relative to the rear half of the hybrid connector 65 will cause the optical fibers OF and conductors C within the flexible tube 59 to distribute a twist along the length of the flexible tube 59. To this end, the optical fibers OF and conductors C may be loosely accommodated within the flexible tube 59. Use of the two-piece rotatable hybrid connector 65 allows the flexible tube 59 to be made of a material which is less able to twist about axis A along its length axis L, as the keying of the hybrid connector 65 to the mating hybrid connector can be partially accommodated by the rotation ability within the hybrid connector 65 itself.

The inner surface 73 of the shell 71 includes a seat 75 for an O-ring 77. The O-ring 77 creates a seal between the inner surface 73 of the shell 71 and an outer surface of the flexible tube 59.

An over molded cover 81, or a shrink tube, is formed over an outer surface of the shell 71 and the outer surface of the flexible tube 59. The outer surface of the shell 71 include a first annular under cut 83 and a second annular undercut 85. The first and second undercuts 83 and 85 act to receive the over molded cover 81 and provide stability to the attachment between the shell 71 and the over molded cover 81 so that the over molded cover 81 does not slide off of the shell 71. The over molded cover 81 assists in attaching the flexible tube 59 to the hybrid connector 65. Adhesive may also be used between the outer surface of the flexible tube 59 and the inner surface 73 of the shell 71 to assist in the attachment.

Instead of the O-ring 77, a gasket may surround and seal to the outer surface of the shell 71 at a location between the second annular undercut 85 and the end of the shell 71, which receives the flexible tube 59. The gasket would include a smaller diameter section located at the end of the shell 71, which receives the flexible tube 59. The smaller diameter section would seal to the outer surface of the flexible tube 59. The over molded cover 81, or heat shrink tube, could be applied over the outer surface of the shell 71, over the outer surface of the gasket, and partially onto the outer surface of the flexible tube 59.

A tube similar to, or the same as, the flexible tube 59 may be substituted for the corrugated polymer tubes used for the first and second jackets 19, 21 in FIG. 1 and/or the first and second jackets 19', 21' in FIG. 2, if an enhanced twist ability is need to clock the first and second connectors 13, 13', 15, 15' to mating ports.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A hybrid cable assembly comprising:
   a transition element comprising a unitary body and having a first region, second region, and a third region; and
   a common sleeve surrounding a plurality of conductors and a plurality of optical fibers and attached to the first region at a first end of the common sleeve;
   wherein the common sleeve comprises a ridged portion at a second end of the common sleeve,
   wherein the second region comprises a nipple extending from the transition element, wherein an environmental sealing nut is configured to mate to the nipple and is attachable to a first jacket that surrounds the plurality of optical fibers, and
   wherein the third region comprises an outer circumferential portion adhered configured to adhere to an inner surface of a second jacket that surrounds the plurality of conductors.

2. The hybrid cable assembly according to claim 1, wherein mating of the environmental sealing nut to the nipple comprises a nut portion of the environment sealing nut which may be tightened to secure the environmental sealing nut to the nipple.

3. The hybrid cable assembly according to claim 1, wherein the first jacket and the second jacket comprise a corrugated flexible material.

4. The hybrid cable assembly according to claim 1, wherein the first jacket comprises a polymer tube which is flexible and twistable about its axis of extension.

5. The hybrid cable assembly according to claim 4, wherein the second jacket comprises a polymer tube which is flexible and twistable about an axis of extension of the second jacket, the hybrid cable assembly further comprising:
   an armor layer surrounding the plurality of conductors, wherein said second jacket surrounds the armor layer.

6. A hybrid cable assembly comprising:
   a common sleeve surrounding a plurality of conductors and a plurality of optical fibers, wherein the common sleeve is attached to a first end of a first transition element and to a first end of a second transition element, such that said plurality of conductors and said plurality of optical fibers enter the common sleeve via the first transition element and exit the common sleeve via the second transition element;
   wherein the first transition element comprises a unitary body and has a first region, a second region, and a third region;
   wherein the first region is at the first end of the first transition element;
   wherein the second region comprises a nipple extending from the first transition element, wherein an environmental sealing nut is configured to mate to the nipple and is attachable to a first jacket that surrounds the plurality of optical fibers;
   wherein the third region comprises an outer circumferential portion configured to adhere to an inner surface of a second jacket that surrounds the plurality of conductors;
   wherein the plurality of conductors and the plurality of optical fibers exit the second transition element via a second end of the second transition element and enter a flexible tube;
   wherein at least one conductor of the plurality of conductors and at least one optical fiber of the plurality of optical fibers are terminated within a hybrid connector rigidly coupled to the flexible tube; and wherein the flexible tube can twist about an axis of extension of the flexible tube more, per linear foot, without incurring a kink than the common sleeve can twist about an axis of extension of the common sleeve.

7. The hybrid cable assembly according to claim 6, wherein a length of the flexible tube from the second transition element to the hybrid connector is between 10 inches and 40 inches.

8. The hybrid cable assembly according to claim 7, wherein the length of the flexible tube is about 24 to 36 inches.

9. The hybrid cable assembly according to claim 6, wherein a length of the flexible tube is about 10 to 30 times a diameter of the flexible tube.

10. The hybrid cable assembly according to claim 9, wherein the length of the flexible tube is about 15 to 25 times said diameter of the flexible tube.

11. The hybrid cable assembly according to claim 6, wherein the at least one conductor includes a plurality of conductors and wherein the at least one optical fiber includes a plurality of optical fibers.

12. The hybrid cable assembly according to claim 11, wherein the hybrid connector includes a first duplex LC connector and a second duplex LC connector, and a first conductive pin or socket and a second conductive pin or socket.

13. The hybrid cable assembly according to claim 11, further comprising:
an armor layer surrounding the plurality of conductors and the plurality of optical fibers and wherein the flexible tube surrounds the armor layer.

14. The hybrid cable assembly according to claim 13, wherein one conductor of the plurality of conductors is electrically connected to the armor layer.

15. A hybrid cable assembly comprising:
a common sleeve surrounding a plurality of conductors and a plurality of optical fibers, wherein the common sleeve is attached to a first region of a first transition element comprising a unitary body, wherein the common sleeve contacts an inner circumference of a first end of a second transition element and wherein the plurality of conductors and the plurality of optical fibers enter the second transition element from the common sleeve via the first end of the second transition element;

wherein the first transition element further comprises a second region having a nipple extending from the first transition element, wherein an environmental sealing nut is configured to mate to the nipple and is attachable to a first jacket that surrounds the plurality of optical fibers;

wherein the first transition element further comprises a third region having an outer circumferential portion configured to adhere to an inner surface of a second jacket that surrounds the plurality of conductors;

wherein the plurality of conductors exit from the second transition element via a second end of the second transition element and are surrounded by a flexible tube; and wherein the plurality of conductors exit the flexible tube and are terminated within a first connector.

16. The hybrid cable assembly according to claim 15, wherein the first connector includes a keying feature which requires a clocked alignment to a mating feature of a port prior to connection.

17. The hybrid cable assembly according to claim 16, wherein the first connector is rigidly affixed to the flexible tube such that the first connector and the flexible tube rotate in unison about an axis of extension of the flexible tube.

18. The hybrid cable assembly of claim 1, wherein the ridged portion of the common sleeve is seated within a first end of a flexible tube, such that an inner surface of the first end of the flexible tube surrounds the ridged portion.

19. The hybrid cable assembly of claim 18, wherein a hybrid connector is seated within a second end of the flexible tube, wherein a LC duplex termination and conductive pin are mounted into the hybrid connector, and wherein at least one optical fiber of the plurality of optical fibers terminates at the LC duplex termination and at least one conductor terminates at the conductive pin.

20. The hybrid cable assembly of claim 6, wherein the flexible tube comprises a first material and the common sleeve comprises a second material different from the first material.

* * * * *

UNITED STATES PATENT AND TRADEMARK OFFICE
CERTIFICATE OF CORRECTION

PATENT NO. : 9,645,341 B2  
APPLICATION NO. : 14/619289  
DATED : May 9, 2017  
INVENTOR(S) : Islam Page 1 of 1

It is certified that error appears in the above-identified patent and that said Letters Patent is hereby corrected as shown below:

In the Claims

Column 8, Claim 1, Line 19:
Please correct "portion adhered configured" to read -- portion configured --

Signed and Sealed this
Ninth Day of January, 2018

Joseph Matal
*Performing the Functions and Duties of the*
*Under Secretary of Commerce for Intellectual Property and*
*Director of the United States Patent and Trademark Office*